United States Patent Office 2,765,202
Patented Oct. 2, 1956

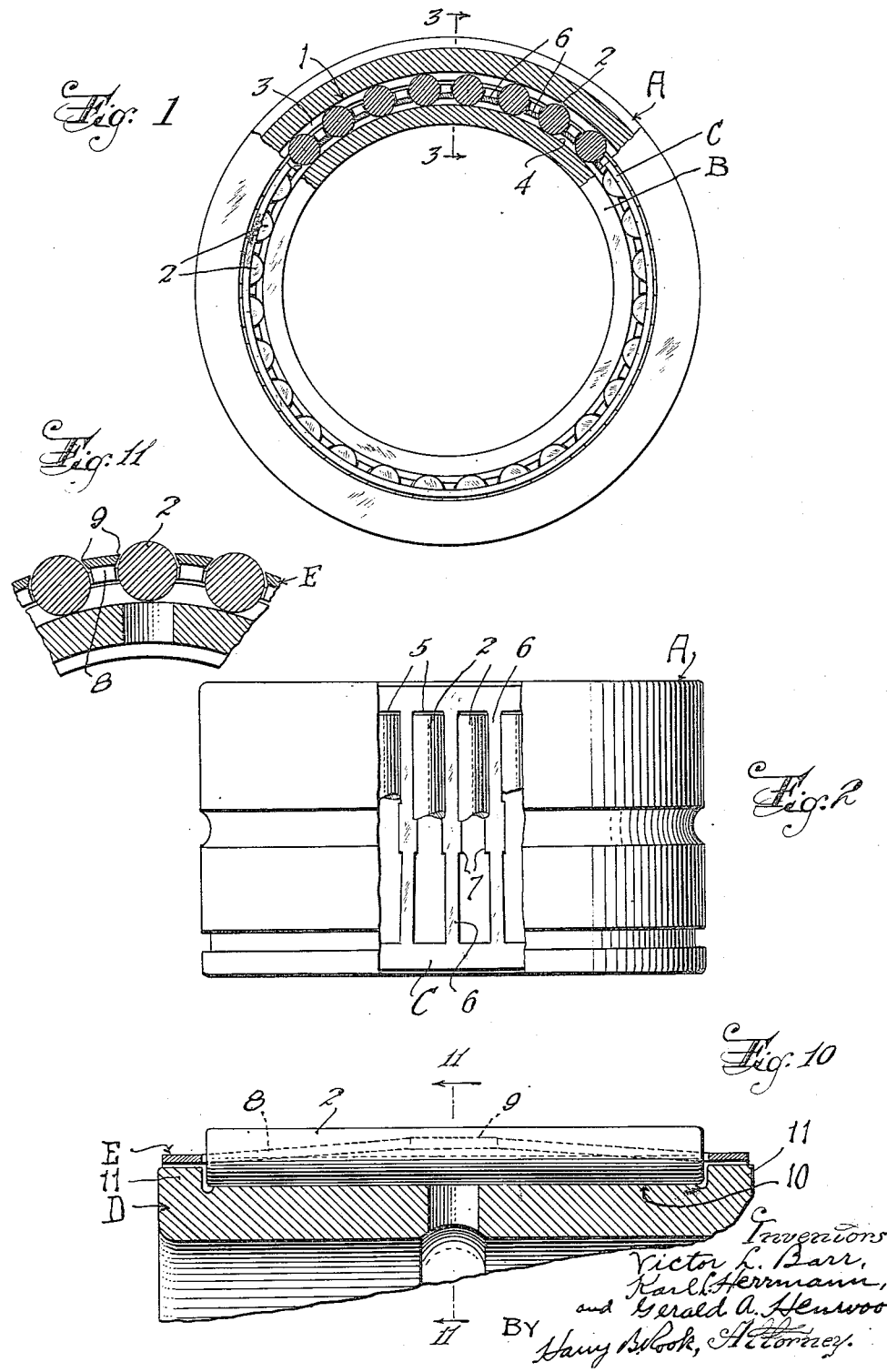

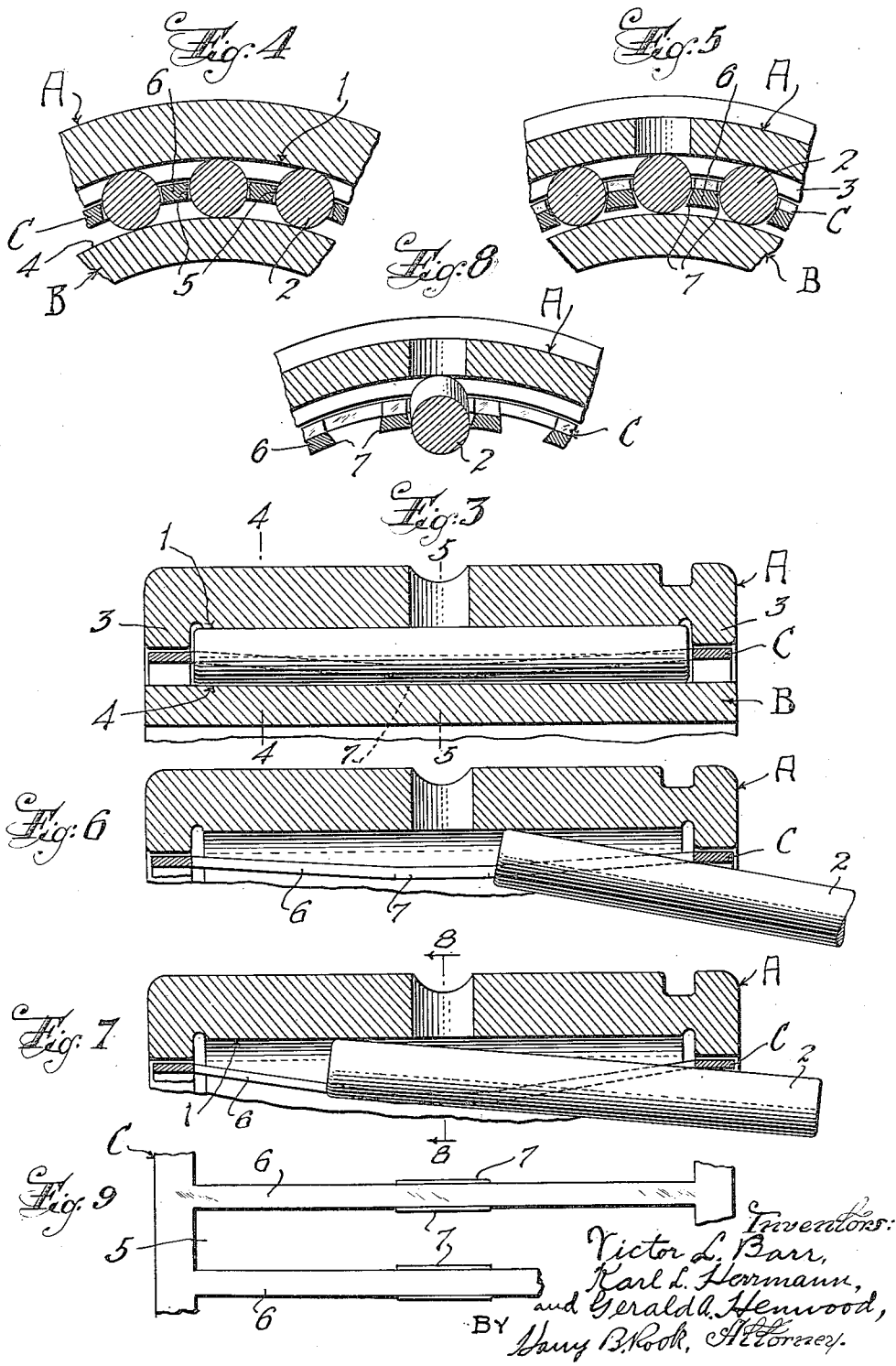

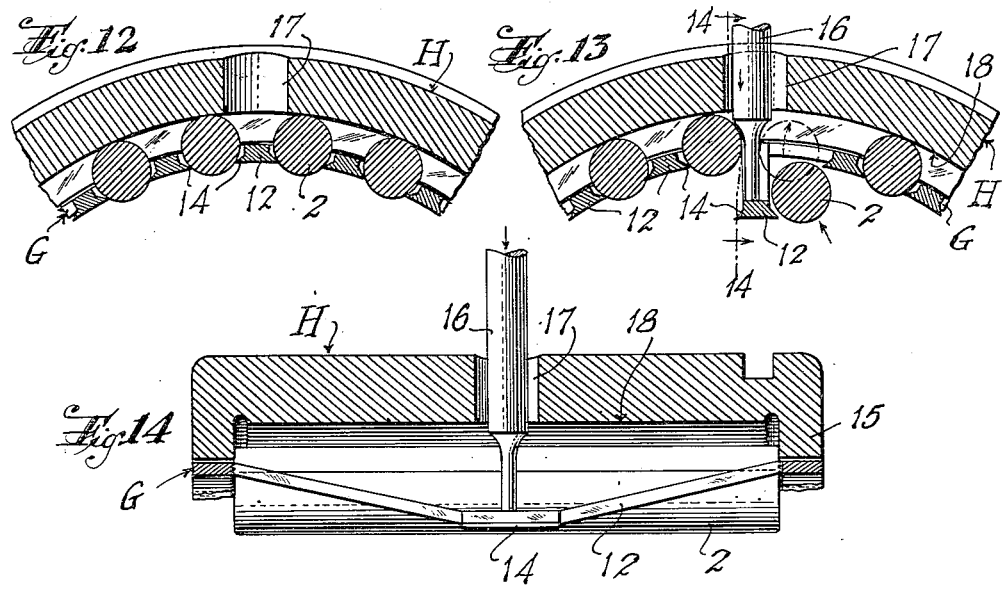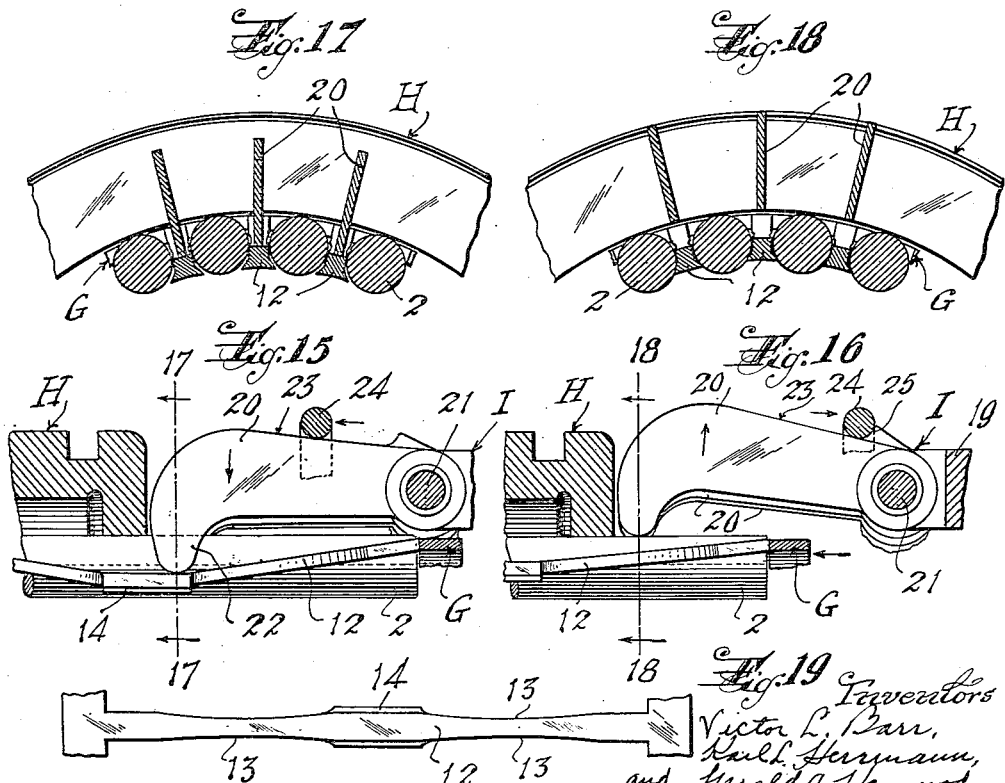

2,765,202

CAGE TYPE ROLLER BEARINGS AND METHOD OF ASSEMBLING ROLLERS THEREIN

Victor L. Barr, Philadelphia, Pa., Karl L. Herrmann, Glendale, Calif., and Gerald A. Henwood, Bristol, Pa., assignors to Roller Bearing Company of America, Trenton, N. J., a corporation of New Jersey Application January 25, 1950, Serial No. 140,436

7 Claims. (Cl. 308—212)

This invention relates to a cage type roller bearing including a hollow cylindrical cage for rollers having a plurality of parallel slots extending therethrough and longitudinally thereof, and a roller in each of said slots the diameter of which is greater than the thickness of the cage so that the peripheries of the rollers extend beyond the exterior and interior surfaces of the cage. More particularly, the invention contemplates roller bearings wherein the rollers are of small diameter, for example, of the needle type, and the wall of the cage is of thin cross-section. The cage is disposed between two race rings or between a race ring and a shaft or journal or other bearing element with the diametrically opposite portions of the peripheries of the rollers engaging respectively the raceways in said race rings or in the race ring and the shaft, journal or other bearing element.

Many roller bearings of this general nature include a race ring having flanges at its ends, and the assembly of a cage and rollers in such a bearing has always constituted a perplexing problem, one solution of which has been to make one of the end or roller-retaining flanges of the race ring separable from the ring so that the cage and rollers assembled therein can be slipped endwise into the raceway and thereafter the separable end flange can be secured in position. This is far from satisfactory and it has always been desirable to make such a bearing with integral flanges on the race rings; and therefore one object of the invention is to provide a novel and improved method of assembling the rollers and the cage in the channel-shaped raceway of a roller bearing race ring having integral roller-retaining end flanges.

Another object is to provide a roller bearing of this type which shall be constructed so that portions of the cage between the roller-receiving slots can be sprung or temporarily elastically deformed to provide for emplacement of said rollers in said slots and for insertion of said cage into the roller raceway disposed between end flanges on the race ring either before or after the seating of the rollers in the cage.

A further and particular object is to provide such a roller bearing which shall have a roller cage of novel and improved construction whereby the cage can be positioned within the race ring and thereafter the rollers can be inserted into the slots in the cage and into the raceway by simple momentary elastic deformation or springing of the portions of the cage between the roller-receiving slots.

In bearings of this general type heretofore the walls of the slots in the cage, depending upon whether the raceway is internal or external of the race ring, have engaged the rollers throughout the lengths of said walls at a zone either inward or outward of the circle in which lie all of the axes of the rollers or at the side of the roller axes opposite the raceway. With this construction considerable friction has occurred between the rollers and the walls of the slots throughout the length of said walls, and the rollers have been inaccurately guided.

Therefore, a further object of the invention is to provide a roller bearing wherein the walls of the roller-retaining slots in the cage shall loosely engage and guide the rollers at their ends substantially at an imaginary circle passing through the axes of all of the rollers and midway of the thickness of the cage wall (which will be hereinafter called the pitch circle), and the walls of the slots shall engage the rollers inwardly or outwardly of said pitch circle only at short zones disposed about centrally of the lengths of the slot walls, thereby to accurately guide the rollers and to reduce to the minimum friction between the rollers and the walls of the slots.

Still another object is to provide for a roller bearing having a race ring with integral roller-retaining flanges, a roller cage having circumferentially spaced roller-guiding bars which are resilient or elastically deformable in radial planes of the cage to facilitate emplacement of rollers in the cage and insertion of the cage in such a race ring.

Other objects, advantages and results of the invention will be brought out by the following description in conjunction with the accompanying drawing, in which Figure 1 is an end elevational view of a bearing embodying the invention, partially broken away and shown in section;

Figure 2 is a side elevational view of the bearing with a portion of the outer race ring broken away for clearness in illustration;

Figure 3 is an enlarged fragmentary central vertical longitudinal sectional view, approximately on the plane of the line 3—3 of Figure 1;

Figure 4 is an enlarged fragmentary transverse vertical sectional view, approximately on the plane of the line 4—4 of Figure 3;

Figure 5 is a similar view, approximately on the plane of the line 5—5 of Figure 3;

Figures 6 and 7 are views similar to Figure 3 but with the inner race ring removed and showing progressive steps in the assembly of the cage and rollers within the race ring;

Figure 8 is a view similar to Figure 5, approximately on the plane of the line 8—8 of Figure 7;

Figure 9 is a fragmentary side elevational view of the cage showing the roller-guiding bars in detail;

Figure 10 is a fragmentary central vertical longitudinal sectional view through another form of roller bearing embodying my invention and having the rollers mounted on the exterior of the race ring instead of on the interior of the race ring as shown in Figure 3;

Figure 11 is a fragmentary transverse vertical sectional view, approximately on the plane of the line 11—11 of Figure 10;

Figure 12 is a view similar to Figure 5, with the inner race ring omitted and showing a modification of the invention with the cage, rollers and outer race ring in normal assembled relation;

Figure 13 is a view like Figure 12 but showing the manner of inserting the rollers between the cage and the race ring;

Figure 14 is a fragmentary vertical longitudinal sectional view, taken approximately on the plane of the line 14—14 of Figure 13;

Figure 15 is a fragmentary vertical longitudinal sectional view showing one step of another method of inserting the rollers and cage in an outer race ring;

Figure 16 is a view similar to Figure 15 showing a succeeding step in the method shown in Figure 15;

Figure 17 is a fragmentary transverse sectional view, approximately on the plane of the line 17—17 of Figure 15;

Figure 18 is a similar view, approximately on the plane of the line 18—18 of Figure 16; and Figure 19 is a fragmentary side elevational view of a portion of the cage and one of the roller-guiding bars shown in Figures 12 to 18, inclusive.

Specifically describing the embodiment of the invention illustrated in Figures 1 to 9, inclusive, the reference character A designates the outer race ring of a roller bearing which has a channel-shaped raceway 1 for rollers 2 at opposite ends of which are end roller-retaining flanges 3 that are integral with the ring. Cooperating with the outer race ring A is an inner race ring B which may be mounted on a shaft or other suitable support and has an exterior raceway 4.

Disposed between the race rings A and B is a roller retainer or cage C which has a plurality of circumferentially spaced slots 5 extending therethrough and longitudinally thereof in each of which is located one of the rollers 2. In accordance with the invention, the cage is tubular and cylindrical and formed of inherently resilient material such as steel. The thickness of the walls of the cage is substantially less than the diameter of the rollers and the outer diameter of the cage is slightly less than the internal diameter of the end flanges 3 of the race rings. The side walls of the slots 5 are formed by roller-guiding bars 6 which incline inwardly from their ends toward the axis of the cage and at approximately the center of their lengths are formed with integral beveled lips 7 that project into the slots, said lips of each slot being spaced apart a distance less than the diameters of the rollers and the other portions of the slots being of a width slightly greater than the diameter of the rollers. The inclination of the end portions of the roller-guiding bars 6 is such that when the cage is inserted in the raceway with the rollers in contact therewith, the side walls of the slots will contact with the rollers adjacent their ends on an imaginary circle which passes through the axes of all of the rollers and midway of the thickness of the cage wall, as shown in Figures 3 and 4. At the same time, the lips 7 will underlie and contact with the rollers centrally of their lengths and inwardly of the pitch circle, as shown in Figures 1, 3 and 5.

In assembling the cage and rollers in a race ring, the cage without rollers is first inserted into the race ring and then the rollers are inserted individually, as shown in Figures 7 and 8. Each roller is inserted endwise into the respective slot until it engages the lips 7 at opposite sides of the slot, as shown in Figure 6. Pressure is then continued on the outer end of the roller tending to push the roller into the race ring, and this action results in the elastic deformation or springing of the roller-guiding bars 6, shown in Figures 7 and 8. This operation is continued until the end of the roller against which pressure is being applied reaches the corresponding end of the roller-retaining slot, whereupon the spring action of the roller-guiding bars 6 will snap the roller into contact with the raceway 1 and between the end flanges 3, as shown in Figure 3; and the lips 7 will thereafter hold the rollers in that position. The inner race ring B or a shaft or other bearing element may then be inserted into the cage.

With this construction, it will be observed that the rollers will be accurately guided at their ends on the pitch circle and will be retained in the cage by the lips centrally of the length of the roller and inwardly of the pitch circle. Also, the cage will be guided on the relatively wide inner edge surfaces of the end flanges 3 and the end thrust of the rollers will be assumed directly by said end flanges instead of by the cage as in some other roller bearings. The construction also provides adequate openings at the ends of the bearing for lubrication, the spaces between the inner and outer race rings or between the race ring and the shaft, as the case may be, providing for easy flow of lubricant to and around the rollers. The most important feature of the invention is the elastic deformation or springing of the roller-guiding bars of the cage to permit insertion of the rollers and thereby make possible the use of a race ring having integral end flanges.

As hereinbefore indicated, the invention also contemplates use with race rings having exterior raceways as shown in Figures 10 and 11. Here, the roller cage is designated E and the roller-guiding bars 8 are inclined from their ends outwardly from the axis of the cage and have roller-retaining lips 9 centrally of their length corresponding to the lips 7. The cage and rollers are mounted on a race ring F having an exterior raceway 10 disposed between end flanges 11. The assembly of the rollers and cage on the race ring is similar to that above described, the rollers being pushed into the slots between the lips 9 and the raceway 10, the roller-guiding bars 8 yielding or springing to permit the rollers to be inserted.

As shown in Figures 12 and 13, in accordance with the invention, the rollers may be inserted between the cage and the race ring by lateral movement of the rollers instead of by endwise sliding of the rollers as hereinbefore described.

According to the method and with the construction shown in Figures 12 to 14, inclusive, the roller-guiding bars 12 of the cage G are narrowed or cut away, as at 13, between the roller-retaining lips 14 and the juncture of the ends of said bars with the end portions of the cage, as best shown in Figure 19, which provides more resiliency in the roller-guiding bars so that the bars can be pressed radially inwardly of the cage a sufficient distance to permit a roller to be moved bodily and laterally between two adjacent roller-guiding bars from the inside of the cage, after the cage has been located within the race ring H which may be identical with the race ring A and has integral end flanges 15.

In assembling the cage, rollers and race ring, the cage G is first slipped into the race ring, as shown in Figure 14, and thereafter a pin or other suitable implement or tool 16 is inserted through the oil hole 17 in the race ring into contact with one of the roller-guiding bars 12, and pressure is exerted on said bar so as to spring the bar radially inwardly of the cage, as best shown in Figures 13 and 14. While the roller-guiding bar is held in this sprung position, a roller is inserted laterally from the inside of the race ring through the space between the sprung bar 12 and the next adjacent bar and into contact with the raceway 18 of the race ring. Thereupon the sprung bar is released and the inherent resiliency thereof causes the bar to spring back to its normal position so as to cooperate with the next adjacent bar to hold the roller in its normal position, as shown in Figure 12. This operation is continued successively with the various roller-guiding bars until all of the rollers have been inserted.

It is also contemplated to insert the rollers into the roller pockets between the roller-guiding bars of the cage before the cage and rollers are inserted into the race ring, as shown in Figures 15 to 18, inclusive. In this form of the invention, all of the roller-guiding bars 12 are simultaneously sprung radially inwardly of the cage by a suitable tool before the cage is inserted into the race ring, and the rollers are placed between the roller-guiding bars and the so assembled rollers and cage are slipped endwise into the race ring, after which the roller-retaining bars are released and spring back to their normal positions to hold the rollers in proper position and in contact with the raceway of the race ring. Any suitable means may be utilized, but as shown, a tool I has a body portion 19 on which a circular row of fingers 20 is pivotally mounted at one end at 21 so that the fingers may encircle the cage G with one finger in contact with the outer surface of each of the roller-guiding bars 12. Each finger has a downturned or inwardly turned end 22 to engage the roller-guiding bar and the outer edges of the fingers have beveled surfaces 23 on which is slidable an actuating ring 24 so that as said ring is pushed toward the outer ends of the fingers, the fingers are pressed inwardly or radially of the cage, as shown in Figures 15 and 17, while when the ring is pushed toward the inner or pivoted ends of the fingers, the latter are permitted to swing outwardly, as shown in Figure 16. A suitable stop 25 may be provided to limit inward sliding of the ring 24.

In operation, one end of the cage is inserted into the tool with one of the fingers 22 in engagement with each roller-guiding bar, whereupon the fingers are pressed inwardly to spring the roller-guiding bars radially inwardly, after which a roller is placed between each two adjacent bars 12 and can be temporarily held in that position with any suitable means, for example, a rubber band or an encircling wire. With the rollers and cage thus assembled, and the outer portions of the rollers approximately flush with the outer periphery of the cage, the end of the cage and the ends of the rollers opposite the tool I are slipped endwise into one end of the race ring H about midway of the length of the rollers, as shown in Figure 15. Then the fingers 20 are released and the cage is pushed further into the race ring, as shown in Figure 16, until the ends of the rollers are juxtaposed to the inner surfaces of the respective end flanges 15, whereupon the roller-guiding bars spring back to their normal positions and hold the rollers in proper relation to each other and to the raceway 18.

While we have shown several now preferred forms of the method and roller bearing, it should be understood that this is primarily for the purpose of illustrating the principles of the invention and that the steps of the method and the structural details of the roller bearing may be modified and changed by those skilled in the art, all within the spirit and scope of the invention.

Having thus described the invention, what we claim is:

1. A cylindrical needle roller bearing comprising a ring having integral flanges with a raceway between them, said flanges having annular faces, cylindrical rollers in said raceway and having symmetrical ends movable into contact with said flanges, a cage having continuous rims overlying and guided on said annular faces and tending to contact the ends of said rollers in a pitch circle through the axes of said rollers, said cage having resilient bars extending along each roller and each integrally connected with both said rims and spaced from one another a distance greater than the diameter of the roller between them throughout at least the greater part of their lengths.

2. A cylindrical roller bearing comprising a race ring having integral flanges with a raceway between them, cylindrical rollers in said raceway and a sheet metal cage having continuous cylindrical rims overlying said flanges and guided thereby, said cage containing roller slots spaced by bars, each slot being of a width slightly greater than the diameter of the roller therein for at least a major portion of its length and said bars having lips projecting into the slot and spaced apart a distance less than the diameter of the roller in the slot between such bars.

3. A cylindrical needle roller bearing comprising a race ring having symmetrical integral flanges with a raceway between them, cylindrical rollers in said raceway and having symmetrical ends, and a thin sheet metal cage having continuous jointless cylindrical rims overlying the faces of said flanges and circumferentially spaced resilient bars connecting said rims and alternating with the said rollers, said rims having surfaces engaging the ends of said rollers in the pitch circle passing through the axes of rotation of all said rollers, and said bars having ears extending towards said rollers on the opposite side of the axes thereof from said raceway.

4. A cylindrical needle roller bearing comprising a race ring having symmetrical integral flanges with a raceway between them and having annular faces, cylindrical rollers in said raceway and having symmetrical ends, and a thin sheet metal cage having continuous jointless cylindrical rims overlying said flanges in close juxtaposition to faces thereof and having resilient bars connecting said rims and alternating with said rollers, said rims having surfaces engaging the ends of said rollers in the pitch circle intersecting the axes of rotation of all of said rollers and said bars being bulged away from said raceway and having lips projecting towards said rollers on the opposite side of the axes thereof from said raceway.

5. A cage for a roller bearing comprising a pair of spaced rims disposed in a common cylindrical plane and bars integrally connecting said rims to one another and having narrow retainer sections intermediate the ends thereof and disposed in a cylindrical plane parallel with but radially spaced from said first plane, said bars having portions oppositely inclined from said rims to said retainer sections and connecting said retainer sections with the respective rims.

6. The method of assembling a cylindrical roller bearing from a race ring having a raceway bordered by integral ribs provided with annular equidiametral faces, a series of cylindrical rollers and a cylindrical cage having symmetrical continuous rims in a common cylindrical plane and connected by spaced, resilient bars integral with both rims, sequential bars aforesaid being spaced from one another along part of their lengths less than the diameter of a roller and spaced along the remainder of their lengths more than the diameter of a roller, which comprises temporarily springing a bar into a substantially symmetrical bulge between its ends and transversely to the common plane of said rims, moving a roller rectilineally across said raceway adjacent to said bar while it is sprung, and releasing the sprung bar and permitting its return to its normal unsprung position when the ends of the roller are between said ribs.

7. The method of assembling a cylindrical roller bearing from a race ring having a raceway bordered by integral ribs provided with annular equidiametral faces, and a cylindrical cage having continuous rims in a common cylindrical plane and connected by spaced resilient bars integral with both rims, sequential bars aforesaid being spaced from one another along part of their lengths less than the diameter of a roller and spaced along the remainder of their lengths more than the diameter of a roller, which comprises seating a series of rollers in the cage with their peripheries each resting on portions of pairs of bars spaced from one another less than the diameter of the roller, and temporarily springing the bars into substantially symmetrical bulges between their ends transversely to said plane to permit deeper seating of the rollers in the cage, and moving the cage and rollers into the ring while the bars are sprung.

References Cited in the file of this patent

UNITED STATES PATENTS

| | | |
|---|---|---|
| 1,204,028 | Johnson | Nov. 7, 1916 |
| 1,395,244 | Andre | Nov. 1, 1921 |
| 1,443,340 | Blomberg | Jan. 30, 1923 |
| 1,477,164 | Close | Dec. 11, 1923 |
| 1,723,369 | Pew | Aug. 6, 1929 |
| 1,764,198 | Carlson | June 17, 1930 |
| 1,765,648 | Bott | June 24, 1930 |
| 1,830,021 | Forney | Nov. 3, 1931 |
| 2,105,013 | Scribner | Jan. 11, 1938 |
| 2,288,023 | Ortegon et al. | June 30, 1942 |